May 28, 1929.  S. G. WINGQUIST  1,714,652
HYDRAULIC TRANSMISSION MECHANISM
Filed July 9, 1926    4 Sheets-Sheet 1

INVENTOR:
Sven Gustaf Wingquist,
By Attorneys,
Fraser Myers + Manley

May 28, 1929. S. G. WINGQUIST 1,714,652
HYDRAULIC TRANSMISSION MECHANISM
Filed July 9, 1926 4 Sheets-Sheet 2

INVENTOR:
Sven Gustaf Wingquist,
By Attorneys,
Fraser Myers Manly

May 28, 1929.  S. G. WINGQUIST  1,714,652
HYDRAULIC TRANSMISSION MECHANISM
Filed July 9, 1926  4 Sheets-Sheet 3

INVENTOR:
Sven Gustaf Wingquist,
By Attorneys,

May 28, 1929.　　　S. G. WINGQUIST　　　1,714,652

HYDRAULIC TRANSMISSION MECHANISM

Filed July 9, 1926　　　4 Sheets-Sheet 4

INVENTOR:
Sven Gustaf Wingquist
By Attorneys,
Fraser Myers & Manley

Patented May 28, 1929.

1,714,652

UNITED STATES PATENT OFFICE.

SVEN GUSTAF WINGQUIST, OF GOTTENBORG, SWEDEN.

HYDRAULIC TRANSMISSION MECHANISM.

Application filed July 9, 1926. Serial No. 121,366.

The invention relates to a mechanism in which power is transmitted from a driving shaft to a driven shaft at variable speed ratios through the medium of a fluid acted upon by pumps.

The object of this invention is to provide an improved multi-speed clutch and transmission mechanism of high mechanical efficiency and in which the resistance to the flow of the fluid transmission medium is comparatively small.

Another object is to provide in a fluid transmission mechanism mechanical coupling means between the elements of one or more of the pumps whereby the relative movements of such elements may be checked to render such pump or pumps inoperative.

A further object is to provide a transmission in which the driving ratios are automatically controlled in accordance with the varying conditions of load and speed, whereby the operator is enabled to control the application of power to a driven member and to secure transmission conditions of free engine, slipping clutch drive, positive hydraulic speed reduction, and direct drive by simply manipulating the engine throttle or other energy controller of the prime mover.

Further objects of the invention will be pointed out in the following description, throughout which reference is had to the accompanying drawings, in which.

A transmission constructed according to the present invention is applicable to any duty wherein power is required to be transmitted at variable speeds from a driving to a driven member. The embodiment now to be described, and representing the preferred form of the invention, is particularly adapted for use in automobiles, trucks and the like employing an internal combustion engine as a source of power. The present device eliminates the necessity for the usual mechanical gearing in automobile transmissions and also the usual clutch mechanism, together with the manual controlling means for both the gears and clutch. With the exception of a manual control of some usual braking means for arresting the motion of the vehicle, an automobile equipped with my transmission requires only a single manual control, this control being the usual engine throttle or accelerator pedal, as it is commonly termed. By the simple regulation of the engine throttle the operator is able to smoothly accelerate the vehicle from a standstill up to maximum speed, the transmission automatically instituting appropriate transmission ratios to secure the maximum performance from a given power application. It is not necessary, as in the usual case, to reduce the power of the engine during any of the speed-changing operations, because in the present device, except when adjusted for idle running, the engine is never disconnected from the load.

The differential pumping system whereby power is transmitted through the fluid medium is fully set forth in my United States Patents Nos. 1,603,179, granted October 12, 1926, and 1,599,626, granted September 14, 1926. Certain features of the automatic regulating mechanism hereinafter to be described are covered by my co-pending United States applications:

Serial No. 575,673, filed July 17, 1922; Serial No. 621,577, filed Feb. 27, 1923; Serial No. 727,689, filed July 23, 1924; and my United States Patent No. 1,610,405, granted December 14, 1926.

The special form of pump abutments and fluid passages between the abutments of adjoining pumps are covered by my United States application, Serial No. 103,036, filed April 19, 1926, and the floating packing rings employed in the present device are the subject of my co-pending United States application, Serial No. 688,247, filed January 24, 1924.

The present transmission is distinguished particularly from known devices of this type in that, while the pumps are of fixed capacity, no valves are interposed between the delivery and receiving pumps to effect changes in transmission ratio. The elimination of valve mechanism between the co-operating pumps has very greatly increased the mechanical efficiency of the transmission when operating in reduced speed by providing a practically ideal path for the exchange of fluid between the pumps, such path being perfectly smooth, free from sudden turns and of minimum length. As the transmission is preferably operated with a lubricating oil as the power-transmitting medium, the friction between the relatively movable parts of the mechanism is very low. Thus, with the practical elimination of mechanical and fluid resistance, the efficiency of the device is relatively high.

Figures 1, 7, 9, 16, 17:
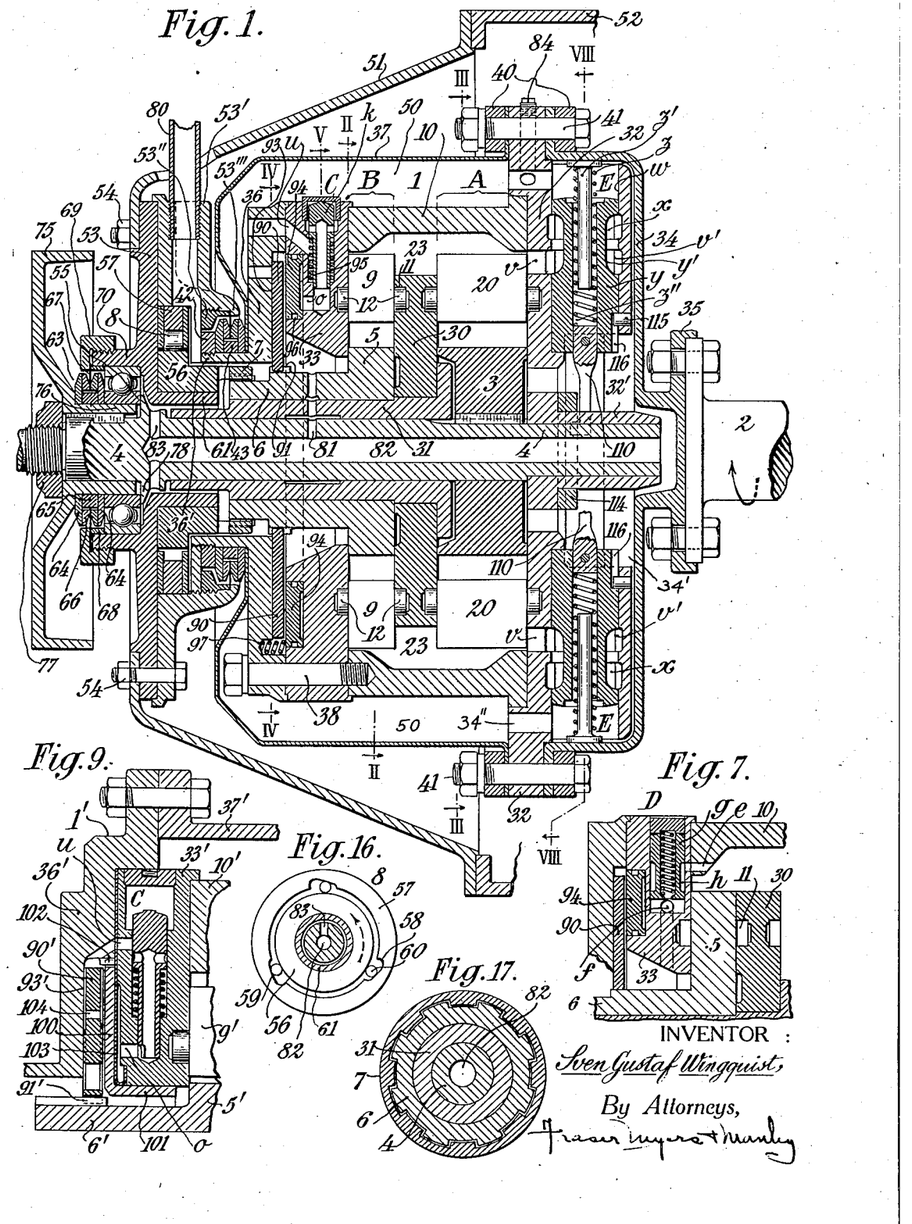
Figure 1 is a vertical axial cross-section of the complete transmission.
Fig. 7 is a fragmentary axial section taken along the line VII—VII of Fig. 6, and shows the pilot valve in the position corresponding to that shown in Fig. 5.
Fig. 9 is an axial vertical fragmentary section of the transmission, showing a modified form of fluid-actuated friction clutch.
Fig. 16 is a transverse cross-section of the roller ratchet device 8, as viewed from the left in Figure 1.
Fig. 17 is a transverse section through the flexible coupling 7, as viewed from the left in Figure 1.

Referring first to Fig. 1, the transmission will now be particularly described. In this form the device comprises a driving rotor 1 connected to a source of power through driving shaft 2. A driven rotor 3 is mounted within the said driving rotor and is fixedly keyed to the driven shaft 4. A releasable stator 5 also within the driving rotor 1 is formed with a sleeve extension 6 surrounding the driven shaft, which extension is connected through a flexible coupling 7 with one element of a roller ratchet 8, the other element of which in turn is mounted on the stationary frame or casing surrounding and supporting the transmission mechanism. The ratchet device 8 is designed so as to permit the stator 5 to freely rotate in the direction of the driving rotor 1, but to prevent rotation in the opposite direction, so that a force tending to oppositely rotate the stator 5 will cause it to be checked by the automatic operation of the ratchet device. Under such circumstances it becomes a fixed member against which fluid may react in the transmission of torque between the driving and driven members of the transmission. The driven rotor 3 and the stator 5 carry sets of radially movable vanes which co-operate with abutments and working surfaces of the annular frame 10 of the driving rotor to form respectively the delivery pump A and the receiving pump or motor B. The two pumps are of a well-known vane pump type and are also fully described in my co-pending applications hereinbefore referred to. The pumps are preferably identical in construction except that the capacity of the receiving pump B in the present embodiment of the invention may be made approximately one-half that of the delivery pump A, this resulting in a reduced speed transmission ratio of approximately 2 to 1. Any other desired intermediate speed ratio may be had by employing pumps of different capacities according to the formula:

$$\frac{\text{Driving speed}}{\text{Driven speed}} = \frac{D}{D-M}$$

Where $D$ = the volumetric capacity of the delivery pump per revolution between its component elements and $M$ = the volumetric capacity of the receiving pump per revolution between its component elements.

If, for example, a speed reduction of 3 to 1 is desired, the capacity of the delivery pump A should be 1.5 times the capacity of the receiving pump.

Figure 2:
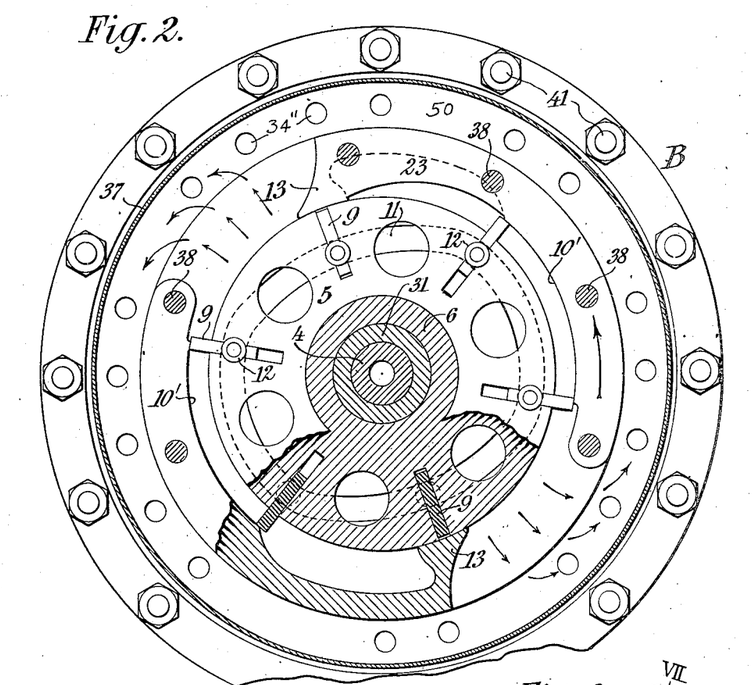
Fig. 2 is a transverse cross-section taken along line II—II of Fig. 1 at the left hand edge of the receiving pump chamber, the view being taken from the left.

In Fig. 2, the receiving pump or motor B is shown as it would appear when viewed from the left in Fig. 1. The vanes 9 slide closely along the working surfaces 10', and are drawn radially inwards by cam grooves 11 acting on the vane rollers 12 so as to escape the abutments 13 carried by the driving rotor frame 10, which frame also carries the aforesaid working surfaces. The abutments which in the present case are diametrically opposed, are designed to provide an effective fluid seal against the periphery of the cylindrical stator element on which the vanes 9 are mounted.

Figures 3, 4, 11:
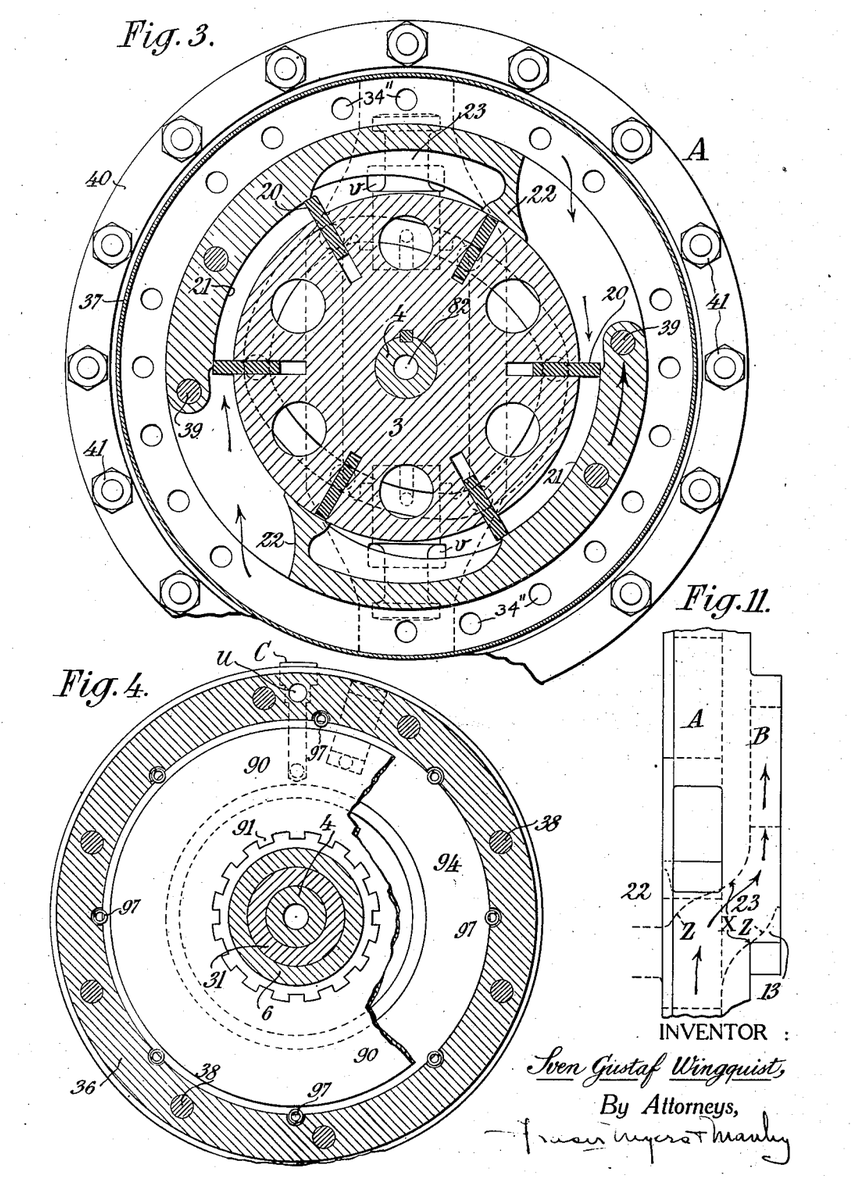
Fig. 3 is a transverse cross-section taken along the line III—III of Fig. 1, the section passing through the delivery pump, and shows the parts as they appear when viewed from the left.
Fig. 4 is a transverse cross-section taken along the line IV—IV of Fig. 1, and shows the friction clutch parts as viewed from the left.
Fig. 11 is a development of the abutments and one of the pressure conduits between the two pumps.

The delivery pump A is shown in cross-section in Fig. 3 as it appears when viewed from the left in Fig. 1, the vanes 20, working surfaces 21 and abutments 22 being similar to those of the receiving pump above described. The relative movements of the parts being reversed, however, the abutments are situated at the opposite ends of the working surfaces. The rotation of the driving rotor frame carrying the working surfaces and abutments of both pumps is in a counter-clockwise direction, as indicated by the arrows in Figs. 2 and 3, the rotor being viewed from the left in Fig. 1. The abutments of the delivery pump being connected to the driving shaft, advance with respect to the vanes 20, the movement of which is resisted by the load on the driven shaft. This causes fluid to be delivered from the pump A through passage 23 to the receiving pump B. In said receiving pump the fluid reacts against the then stationary vanes 9 and does useful work by impelling the abutments 13 in a direction favoring the rotation of the driving rotor. The receiving pump B virtually acts as a booster motor, augmenting the torque of the driving rotor. This additional torque is transmitted to the driven shaft 4 by virtue of an increased fluid pressure acting on the vanes 20 carried by the driven rotor 3.

The course of the fluid circulated between pumps A and B will be made apparent by consideration of the diagram in Fig. 10. The figure is not drawn to scale nor are the various parts accurately illustrated. Furthermore, in the diagram all the automatic control features have been eliminated. Parts corresponding to those in Figs. 1, 2 and 3 are correspondingly numbered. The purpose of the diagram is merely to show the course of the fluid in its circulation between the pumps and the direction of rotation of the several parts. Power may be applied to the rotor 1 by means of a belt acting on the pulley surface a. The abutments 22 of the delivery pump and abutments 13 of the receiving pump form part of the driving rotor 1. The driven rotor 3 carrying vanes 20 (only two of the six vanes being shown) is fixed to the driven shaft 4. The stator 5 carrying vanes 9 is prevented from rotating by a checking device 8 which acts on the stator sleeve extension 6. The conduits between the pressure chambers of the delivery pump A and receiving pump B are diagrammatically indicated as pipes 23. The suction or idle fluid chambers of the pumps are in open communication through ports leading into the annular fluid chamber which completely surrounds both pumps and forms part of the driving rotor. The series of small arrows indicate the movement of fluid when pump A is delivering fluid to receiving pump B, while the large arrows at the ends of the transmission indicate the direction of movement of driving and driven parts.

As the abutments 22 of pump A are rotated with the driving rotor, fluid will be ejected from pump A due to the fact that the rotation of the driven rotor 3 and vanes 20 is resisted by the load on the driven shaft. The fluid entering the pressure chamber of the receiving pump or motor B reacts against the stationary vanes 9 and builds up a pressure, which, exerted upon the abutments 13 of the driving rotor, results in the transfer of torque to such rotor. At the same time the faces of the abutments in pump A, which faces are not exposed to the driving fluid pressure, are moving away from the vanes in the suction chambers of the pump, thereby drawing in fluid from the annular fluid chamber formed in the driving rotor. The faces of the abutments 13 in the receiving pump B, which faces are not exposed to the driving fluid pressure, are carried toward the vanes 9, thereby expelling fluid from said pump to the annular fluid chamber. It is thus evident that when the two pumps are in operation, a continuous circulation of fluid occurs, pump A delivering fluid under pressure to the receiving pump B and at the same time receiving exhaust or idle fluid from said receiving pump.

It is obvious that if the stator 5 be clutched to the driving rotor 1, no relative motion between the vanes and abutments of the receiving pump B will occur. In consequence, no fluid can circulate in the system. The fluid trapped in the pressure chambers of the pump A between the abutments on the driving rotor and vanes on the driven rotor will effectually couple the driving and driven parts together so that they will rotate as a unit. By this method direct drive is achieved.

Figure 10:
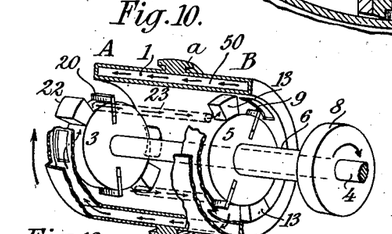
Fig. 10 diagrammatically illustrates the arrangement of parts and course of the fluid in the form of transmission illustrated in Figs. 1 to 8 inclusive.

Without any alteration in the device shown in Fig. 10, a gearing up instead of a gearing down effect may be achieved by applying power to the shaft 4, the casing 1 which was formerly the driving element now being the driven element. Under such conditions the flow of fluid will be reversed, providing the shaft 4 is still rotated in the direction of the arrow, the pump B becoming the delivery pump and causing fluid to flow under pressure to what is now the receiving pump A. If the transmission in the former case gave a 2 to 1 speed reduction, it will now, with the driving and driven parts interchanged, give a 2 to 1 increase in the speed.

A reverse drive may also be had through a transmission similar to that indicated in Fig. 10 by increasing the size of pump B so that its capacity is greater than that of pump A.

If in such a transmission power be applied to the casing 1 in a counter-clockwise direction (opposite to the direction indicated by the arrows), the pump B will deliver fluid under pressure to the pump A, which, under such conditions, becomes a receiving pump, the abutments 13 advancing counter-clockwise towards the stationary vanes 9 forcing fluid through conduit 23 to the pressure chamber of pump A. In spite of the fact that the abutments 22 are driven in a counter-clockwise direction, the vanes 20 will be moved by the fluid entering the pump A, which now acts as a receiving pump, in a clockwise direction because of the fact that the capacity of pump B exceeds the capacity of pump A.

This will be clearly understood if we assume for a moment that the two pumps are made of equal capacity. Under such conditions a movement of abutments 13 toward the stationary vanes 9 will displace exactly the amount of fluid, which, acting upon the A pump, will permit abutments 22 to move counter-clockwise with respect to vanes 20 without creating either pressure or suction, and in consequence, said vanes will remain stationary. If, however, as in the present case, the capacity of pump B exceeds the capacity of pump A, more fluid will be delivered to the pressure chamber of the latter pump than can be swallowed by the relative movement of the abutments and vanes occasioned by the counter-clockwise rotation of the abutments.

In consequence of this, the excess fluid delivered to the A pump will cause a backward rotation of the driven element carrying vanes 20, and the rate of this backward rotation will be dependent upon the relative capacities of the two pumps, it being possible to obtain any reverse speed reduction or speed increase by varying the capacity of the A pump between that equal to the capacity of pump B and an extremely small capacity, which, obviously, would give rise to very high reverse speeds.

Figures 12, 13:
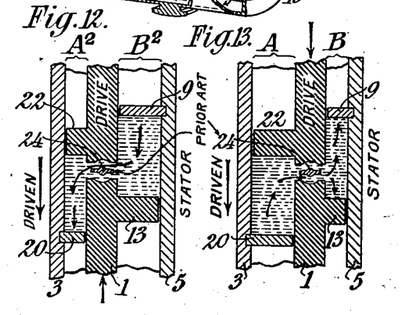
Fig. 12 is a schematic diagram illustrating the direction of forces acting upon the elements of a reverse drive transmission constructed generally as shown in Figs. 1 to 8 inclusive, but in which the capacity of the pump connected to the stator exceeds the capacity of the pump connected to the driven rotor.
Fig. 13 is a similar diagram indicating the forces obtained by constructing the transmission with pumps having the relative capacities of those shown in Fig. 1.

The comparison of the forward and reverse drives which may be had by constructing the transmission either with the capacity of pump A or pump B respectively the larger, is simply illustrated in the diagrams shown in Figs. 12 and 13. In the latter figure corresponding to the construction shown in Fig. 1 the driving element 1 carrying the abutments 22 and 13 of both pumps A and B, is shown as moving downwards. The driven element 3 carrying vane 20 also moves in the same direction, but because the abutment 13 of the receiving pump B is, by its downward movement enlarging the space between itself and the vane 9, a flow of fluid will occur between the two pumps, as indicated by the line of small arrows, this flow permitting the driven element to lag somewhat behind the driving element and at the same time increasing the effective torque of the driving element by the application of fluid pressure to the abutment 13 in the receiving pump B.

In Fig. 12 the operation of the transmission constructed to give a reverse drive is indicated. In this instance, if we assume that the driving element 1 carrying abutments 22 and 13 is moved upwards, the driven element 3 will be propelled downwards because of the fact that the upward movement of abutment 13 toward the stationary vane 9 causes a greater quantity of fluid to be ejected from pump $B^2$ (now acting as a delivery pump) than can be swallowed by pump $A^2$ (now acting as a receiving pump or motor), unless the working chamber of the latter pump is expanded by a downward movement of the vane 20.

Figure 15:
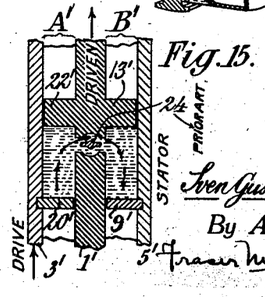
Fig. 15 is a schematic diagram indicating the forces acting upon the parts of the transmission of the modified type shown in Fig. 14.

In both Figs. 12 and 13, and in Fig. 15, which will presently be discussed, a valve 24 is interposed between the two pumps. This valve illustrates a means heretofore known for effectively coupling the driving and driven elements of the transmission together for direct drive by trapping fluid in the chamber of the pump, the elements of which, are interposed between the driving and driven members of the transmission. According to the present invention, such valve has been eliminated, and instead, the circulation of fluid between the pumps is controlled preferably by connecting the releasable stator 5 with the element of the transmission with which it co-operates to form a pump, so that relative motion of the parts of such pump is prevented. In this manner the pump is just as effectually eliminated as a factor in producing a flow of fluid in the system as if a valve, such as the valve 24, were interposed between the pumps to stop circulation between them.

Figure 14:
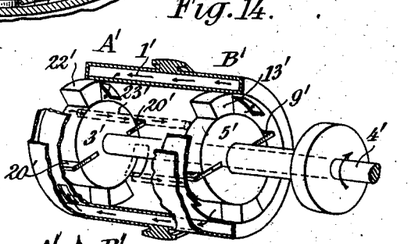
Fig. 14 is a diagrammatic illustration of a modified form of transmission in which a speed reduction is had by applying power to the internal rotor instead of to the casing.

In Fig. 14 there is diagrammatically shown the modified form of transmission to which my co-pending United States application Serial No. 588,657 previously referred to relates. This construction differs from that illustrated in Fig. 10 in that the fluid connection between the two pumps connects similarly disposed chambers of the two pumps together, instead of as in the previous construction connecting chambers which are on opposite sides of the abutments in the two pumps. In this modification, to obtain a speed reduction, power is applied to the shaft 4′ which carries the now driving rotor 3′, the casing 1′ being the driven element and carrying abutments 13′ and 22′ of the two pumps A′, B′ respectively. If the driving shaft 4′ be rotated in a clockwise direction, the vanes 20′ approach the driven abutments 22′, the motion of the latter being resisted by the load, and fluid is thereby forced through conduits 23′ to the working chambers of the receiving pump B′. The reaction of the fluid against the stationary vanes 9′ builds up a fluid pressure within the chambers of the receiving pump B', which produces a thrust in a clockwise direction against the abutments 13' which form part of the driven rotor. In this form of device it will therefore be observed that the casing 1 is urged in a clockwise direction by two forces, one being the fluid pressure against the abutments 22' of the delivery pump, and the other being the fluid pressure against the abutments 13' of the receiving pump. If, for example, the areas of the abutments in both pumps are equal, the torque on the driven element 1' will be twice that applied to the driving shaft 4' if the fluid is permitted to circulate between the two pump systems, as above described. If, for example, the torque produced by the prime mover and transmitted to vanes 20' is sufficient to give rise to a certain fluid pressure, this pressure applied in the two pumps to the combined torque producing surfaces of the two sets of driven abutments, which have together just twice the effective area of the driving vanes 20', will exactly double the torque delivered by the driven element.

In the modified form of transmission illustrated in Fig. 14, which I will hereinafter refer to as my inverted drive, (the device in Fig. 10 being considered the normal drive), the idle fluid return through the outer casing 1' requires no explanation, as the annular fluid chamber completely surrounds both pumps, as heretofore described. The idle fluid exhausts from the pump B' and is returned to the pump A', as indicated by the small arrows within the casing.

The diagram in Fig. 15 indicates the fluid flow and direction of forces acting upon the elements of the inverted drive above described. Power is applied to the rotor 3' carrying vanes 20' in an upward direction. If the pumps A' and B' are functioning, the stator 5' carrying vanes 9' will remain stationary, and fluid will be forced out of the pump A' and into the receiving chamber of pump B'. The abutments 22' and 13' carried by the driven element 1' will be acted upon by the fluid pressure within the pumps, tending to move the driven element also in an upward direction. It will be readily understood that the larger the capacity of the receiving pump B' is with respect to the capacity of the pump A', the greater will be the speed reduction between the driving and driven parts. If the two pumps are of equal capacity, a 2 to 1 speed reduction will be had. The greater the relative capacity of the pump B', the greater will be the speed reduction. It will also be evident that if the driving and driven parts be interchanged, that is to say, if the part 1' be moved downwardly, the part 3' becoming the driven member, will move downwardly at a rate faster than the driving element. The driving ratio of a transmission of the inverted drive type may be determined by the following equation:

$$\frac{\text{Driving speed}}{\text{Driven speed}} = \frac{M+D}{D}$$

Where $M$=the volumetric capacity of the receiving pump B', and
$D$=the volumetric capacity of the delivery pump A'.

The foregoing discussion of the principles involved in the various forms of my transmission device have been given primarily to indicate that the present invention is applicable to a variety of types of hydraulic transmissions and is in no way limited to the detailed construction illustrated in Fig. 1, for example.

On the contrary, my invention is equally applicable to any transmission employing one pump which is actuated by the difference in speed between a driving and a driven shaft and another pump in fluid communication therewith, which is actuated by the difference in speed between a stationary element and either the driving or driven shaft. Instead of controlling the flow of fluid between such connected pumps by means of a valve whereby to lock the fluid between the driving and driven elements so as to produce a direct drive, I provide means for mechanically connecting the stator to the element with which it otherwise normally co-operates, and thereby eliminate from the system the capacity of one of the pumps. The stator, of course, is released at such times for free rotation with the said element. In this manner, what may be called the stator pump of the transmission shown in Fig. 1 is no longer operative, and in consequence, no fluid will circulate between it and the pump interposed between the driving and driven shafts to effect a change in the transmission ratio.

Returning now to complete the description of the preferred embodiment of the invention illustrated in Figs. 1 to 11 inclusive, we will consider the assembly of the driving rotor 1, within which the two pumps A and B are mounted, together with the automatic control means therefor. As previously pointed out, the abutments and working surfaces of the two vane pumps are formed within the annular driving rotor frame 10. This frame is divided into two compartments by partition 30, through the central bore of which passes a flanged sleeve 31 which serves as a journal for the left hand end of the driving rotor. Sleeve 31 is rigidly secured in the said partition but freely rotates about the driven shaft 4 which supports it. Within the two compartments formed in the rotor frame 10, the previously described vane pumps A and B are mounted, and the pump chambers are closed by the rugged end plates 32 and 33. The end plate 32 is provided with a central-hub extension 32' which affords an ample bearing for the right hand end of the transmission upon the driven shaft 4. To the right of end plate 32 a dished cover plate 34 encloses certain elements of the automatic controlling devices, also providing an idle fluid compartment 34' at the right-hand end of the transmission, said cover extending completely across the end thereof without any openings whatever, as no shafts are required to pass through it. Power is transmitted to the transmission through a flange 35 formed integrally with cover 34, the flange on the driving shaft 2 being bolted to the cover flange 35, as shown, or coupled thereto by any suitable flexible coupling means. The left hand end of the driving rotor is completed by a clutch housing plate 36 and a comparatively light weight fluid-retaining apron 37, which latter completely surrounds the two pumps and automatic control mechanism therefor to the left of the end plate 32 above referred to. The annular driving rotor frame 10, together with the end plates 32, 33 and clutch housing plate 36, are rigidly fastened together so as to form a substantially unitary structure, by means of a plurality of lag-bolts 38 and 39. The right hand cover plate 34, and apron 37, which serves as the fluid-retaining means for the left hand part of the transmission, are flanged as shown in Fig. 1, the flanges thereof being securely fastened against the projecting rim of end plate 32 by means of clamping rings 40, which are secured in place by bolts 41.

The apron 37 is at its left end firmly clamped against the plate 36 by means of a locking ring 42 which is threaded on an annular hub-like projection 36' formed integrally with the clutch housing plate 36. The said locking ring actually presses against the annular floating packing device 43, which, in turn, forces apron 37 against plate 36.

The apron 37 above referred to provides a large and unobstructed annular idle fluid chamber 50 around the working parts of the transmission whereby the idle fluid may be returned from the exhaust of the receiving pump B, to the suction or intake ports of pump A. This chamber also encloses the friction clutch and automatic control devices in the left hand end of the driving rotor and is in open fluid communication with such devices. Said chamber also through ports 34" communicates directly with the compartment 34' in which certain automatic valves are located, as will hereinafter be more fully set forth.

The entire transmission is surrounded by a stationary annular casing 51, which, where the transmission is applied to an internal combustion engine, is preferably rigidly mounted upon the engine crank case 52 or other part of the engine frame formed integrally therewith. A bearing supporting plate 53 is rigidly clamped in the left hand end of casing 51. An annular reinforcing or backing member 53' is rigidly secured to supporting plate 53 and casing 51 by means of a plurality of bolts 54 which pass completely through these three elements, as shown in Fig. 1. The annular reinforcing member 53' is centrally recessed to receive the annular roller ratchet device 8 and to hold the outer element of the same rigidly in position. The member 53' is at its right hand side interiorly threaded to receive a locking ring 53" which clamps the diaphragm of the floating packing device 43 firmly against a shoulder 53'" projecting inwardly around the bore of the annular reinforcing member 53'. The floating packing device 43 is in every respect except size, similar to the floating packing 63, which will hereinafter be more fully described, so that no further description need here be made of this element.

The bearing plate 53 has two important functions: One being to afford a support for the end bearing 55 of the driven shaft 4, and the other to afford a suitable mounting for the roller ratchet device 8 through which the left hand element 56 of flexible coupling 7 connected to the releasable stator 5, is clutched or released from the stationary frame of the transmission in accordance with the direction of forces tending to rotate, or resist the rotation of, the stator 5 which forms the internal element of the receiving pump B. The roller ratchet device 8 is shown in transverse section in Fig. 16, as it appears viewed from the left in Fig. 1, and is of the usual construction. An outer annular ring 57, which is fastened to plate 53, has formed within it a plurality of roller recesses 58 having inclined surfaces 59, between which, and the relatively movable element 56 of the ratchet device, rollers 60 are adapted to effect a clutching action when the element 56 which is connected to the stator of pump B tends to rotate in a clockwise direction.

The flexible coupling 7 between the tubular extension 6 of stator 5, and the internal element 56 of the roller ratchet device 8, may be of any known construction. In Fig. 17 there is illustrated a suitable form of coupling, which comprises two interfitting splined elements having a slight amount of play between them to permit small movement sufficient to accommodate slight differences in alignment between the stator sleeve 6, which is carried on the driving rotor bearing sleeve 31, and the ratchet element 56, which rotates on an inward annular hub projection 61 of stationary plate 53.

While, as previously described, the driven shaft 4 is supported upon the stationary plate 53 by a suitable anti-friction bearing 55 (which may be either of the ball or roller type), such bearing would not provide a proper seal to prevent the escape of fluid from the transmission. The necessary seal is provided by a second floating diaphragm packing device 63 similar to the packing device 43 interposed between the driving rotor and a stationary member fastened to casing 51. Two seals are thus provided, one between the driving and stationary parts, the other between the driven and stationary parts. Any good packing device may be used at these points. However, the floating diaphragm type, which is the subject of my co-pending United States application Serial No. 688,247, hereinbefore referred to, is particularly adapted to the purpose.

The inner elements of my packing device comprise two annular retaining rings 64, between which is firmly clamped a spacing ring 65 of lesser diameter. A floating annular ring 66 runs freely in the space between the retaining rings 64, the ring 66 virtually floating because of the fact that it is circumferentially supported by a comparatively flexible diaphragm 67. The floating ring 66 and diaphragm 67 are rigidly fastened together, the diaphragm preferably being clamped between the two halves of such ring. The diaphragm and floating ring form the stationary part of the packing device, and the diaphragm is clamped around its outer edges against a spacing ring 68, which holds the bearing 55 in place; and the inwardly projecting flange of a threaded retaining ring 69, which screws on to an annular extension 70 formed integrally with supporting plate 53. It will be observed that the annular extension 70 on supporting plate 53 provides a seat for the outer member of the anti-friction bearing 55.

If, as in the present instance, it is desired to incorporate a friction brake to act on the transmission shaft, a brake drum 75 having a central hub portion 76 may be keyed to the driven shaft 4, as shown in Fig. 1, the drum being held rigidly in place against axial displacement by a large nut 77 threaded directly on the driven shaft 4. In this construction the shaft 4 is provided with a shoulder or flange portion 78, against which the inner ring of the anti-friction bearing 55 rests. The inner member of the floating packing device 63 and the end wall of brake drum 75, are, like the inner ring of bearing 55, so disposed as to be rigidly clamped together between flange 78 and the aforesaid nut 77. The brake drum 75, floating packing device 63 and antifriction bearing 55 are thus centrally clamped together in such fashion as to provide a fluid-tight joint between such elements and the driven shaft 4.

The transmission is preferably designed so as to insure access of the fluid transmission medium to all of its moving parts whereby adequate lubrication is insured if a suitable lubricating oil is used as the power transmitting medium. It will, however, be understood that the only fluid which has access to the transmission bearings and packing devices 43 and 63, and also to the annular chamber 50 surrounding the pumps, is the idle fluid which is not ordinarily subject to any fluid pressure whatever other than that represented by the small hydrostatic pressure due to the elevation of an oil reservoir which is in direct communication with the interior of the transmission through a pipe 80. In a transmission so designed there is obviously no real difficulty in preventing the escape of fluid, because at none of the points where leakage would be likely to occur is there present any appreciable fluid pressure. Very large fluid pressures are, of course, developed between the co-operating pressure chambers of the two pumps A and B, the degree of pressure varying with the torque load, but this high pressure is confined to the working chambers of the pumps and the short pressure channels 23 connecting these chambers together. Small bores communicating with the pressure chambers of the pumps admit this driving fluid pressure to certain chambers of the automatic control mechanism, as will hereinafter be fully set forth, but the fluid under pressure is confined in the various control chambers so that, as above stated, for all practical purposes as far as the problem of leakage is concerned, the fluid under pressure is confined to the working chambers of the pumps and it never reaches the bearings.

The passages which provide for the distribution of idle fluid to all parts of the transmission for lubricating purposes will now be briefly described. The details are clearly shown in Fig. 1. It will be seen that between all the relatively moving parts of the transmission which are not required to bear against one another, space has been provided for the free flow of fluid. A series of channels are easily traceable in the figure from the pipe 80 communicating with the reservoir (not shown) to both of the floating packing devices 43 and 63, and also to the interior of the long sleeve bearings 6 and 31 surrounding the driven shaft 4. These bearings receive fluid midway between their ends through ducts 81 communicating with a central bore 82 in the driven shaft, which bore, at the right hand end, is open to the idle fluid within the cover plate 34. The bore 82 also communicates to the left through a transverse bore 83 with the idle fluid spaces which lead to the supply pipe 80. In filling the transmission with oil, care must be taken to eliminate air from the various chambers and passages, which is accomplished by venting the chambers to the atmosphere, suitable screw plugs being provided for this purpose at various points, one such plug 84 being shown in dotted lines at the top of the driving rotor in Fig. 1.

An important feature of novelty of the present invention resides in a means for mechanically connecting the stator 5 of the receiving pump or motor B with the driving rotor 1, whereby the said pump is rendered inoperative when its capacity to receive fluid is not wanted. This is the case when the transmission is to operate in direct drive. As hereinbefore set forth, if no relative motion can take place between the vanes 9 carried by the stator, and abutments 13 carried by the driving rotor, the receiving pump B has no capacity whatever to receive fluid from the delivery pump A, and since the only path of escape for fluid from the pressure chambers of the delivery pump is through the receiving pump B, fluid will be trapped within the pressure chambers and power will be transmitted from the driving rotor 1 to the driven rotor 3 by the action of such trapped fluid on vanes 20 of the driven rotor. In this condition there is no flow of fluid within the transmission, the trapped fluid acting virtually as a solid connecting link between the driving and driven parts. Obviously, therefore, in direct drive there will be no mechanical losses whatever due to the friction of working parts or resistance to fluid flow.

One construction for clutching the releasable stator 5 to the driving rotor 1 is illustrated in Fig. 1. However, the preferred embodiment of this portion of the mechanism is illustrated in the enlarged fragmentary view shown in Fig. 9. The form in Fig. 1 will be first described.

The clutch may, of course, be operated in any suitable manner and my invention is not limited to the operating mechanism herein described. In the preferred embodiment the clutch is automatically set and released in accordance with the operating conditions to which the transmission is subjected, the clutch being directly actuated by fluid pressure which is under the control of automatic valve devices, which will hereinafter be described.

In Figure 1 the clutch is shown as comprising a single friction disk 90 which is splined to the hub portion 6 of the releasable stator 5. The arrangement of splines 91 is also shown in Figure 4. The disk 90 is thereby rigidly held against rotation with respect to the stator but is free to slide axially over a slight distance to permit accommodation between it and the friction elements 93 and 94, with which it co-operates. The element 93 is an integral part of the driving rotor 1, and the element 94 is a flat ring which is situated in an annular recess 95 in the member 33, which latter is also a part of the driving rotor. The friction element 94 is actually an annular piston, suitable packing being provided in grooves 96 to make it slide in substantially fluid-tight contact with the walls of the recess 95.

When fluid pressure is admitted to the chamber 95 on the right hand face of piston 94, such piston moves to the left, and since the pressure is active over its entire annular surface it clamps the floating friction disk 90 against the co-operating friction surface 93 throughout its entire circumference and thereby effects a positive drive between the driving rotor 1 and the stator 5. As has previously been described, the stator is always free to be rotated with the driving rotor because of the release of the ratchet device 8, which device only prevents the stator from rotating in a direction opposite to that of the driving rotor.

If the annular piston 94 be relieved of fluid pressure on its right hand face, a plurality of return springs 97 insure the disengagement of the clutch by forcing the piston back into its annular recess 95.

The preferred construction of the fluid-actuated friction clutching device is shown in Fig. 9. The elements in this figure which are referred to by numbers having prime marks after them, indicate members whose function corresponds to elements similarly numbered but without the prime marks in Fig. 1. Thus, the apron 37' corresponds to apron 37, though in Fig. 9 it is shown as a somewhat heavier construction, and the clutch housing disk 36' corresponds to the clutch housing disk 36, etc. In Fig. 9 the friction disk 90' of the clutch is slidably splined on the hub 6' of stator 5', as in the embodiment previously described. The function of the clutch disk 90' is also the same, i. e., to couple the stator to the driving rotor. The clutch disk is forced into contact with friction surface 93' by means of a fluid-actuated element comprising an annular plate-like member 100 having a centrally formed circular flange 101 fitting loosely into the annular recess within the plate 33'. The fluid-actuated member 100 is coupled by means of splines 102, to the driving rotor so that it rotates therewith, but is free to move axially.

In this embodiment the fluid does not directly act upon disk 100 (corresponding to annular piston 94 in the embodiment shown in Fig. 1), but instead acts on a flexible diaphragm 103, which may be made of flexible sheet metal, leather or other suitable material. The movement required between the parts to effect the clutching and uncoupling of the co-operating clutch elements is so slight that the flexible diaphragm is not unduly stressed or subject to wear. The clutch disk 90' is provided with a plurality of bores 104 which permit idle fluid to pass from one face to the other, so that the disk will not tend to adhere to the surfaces with which it co-operates after the actuating disk 100 has been relieved from the fluid pressure.

The automatic clutch-control mechanism will now be described, it being understood that this mechanism may be used in connection with either the clutch device shown in Fig. 1 or that shown in Fig. 9. The mechanism comprises two valves, C and D respectively. The valve C we will call the master valve, and the valve D the pilot valve. The function of the master valve C is to connect the annular space to the right of the clutch-actuating members (94 in Fig. 1, 100 in Fig. 9) with the pressure side of the pumping system or with the idle fluid side, in the former case to apply the clutch, and in the latter to release it. The function of the pilot valve D is to relieve the master valve of fluid pressure at speeds below a predetermined number of R. P. M. Until such speeds are reached, the master valve is under the control of the pilot valve, and under no circumstances can fluid pressure act on the clutch to produce direct drive until this critical speed of the pilot valve has been exceeded. The master valve is designed to be responsive to the opposing actions of centrifugal force and fluid pressure, while the pilot valve is sensitive only to centrifugal force against the action of a spring. Above a predetermined speed of the driving rotor 1, in which both valves are mounted, the pilot valve D will occupy the position shown in Figs. 5 and 7, and below this predetermined speed the pilot valve will occupy the position shown in Fig. 6 in dotted lines.

Fluid pressure from the working chambers of the vane pumps is admitted to the pilot valve bore $d$ through a port $e$, and the valve bore is in communication with the idle fluid side of the transmission through port $f$. The pilot valve proper comprises a piston $g$, which, toward its inner end, is cut away to provide an annular recess $h$. This recess is sufficiently wide so that when the valve piston $g$ is in the position shown in dotted lines Fig. 6 (its inner position), the port $i$, which connects the pilot valve with the master valve C, will communicate with the idle fluid port $f$ through said annular recess $h$. The said port $i$ between the two valves C and D, when the valve is in the position shown in Fig. 5 (its outer position), will communicate with pressure port $e$ through the said annular recess $h$. The piston $g$ slides freely in its bore so that it is responsive to the action of centrifugal force, which tends to move it outward against the tension of a coiled spring $j$.

The master valve comprises a piston $k$ having hollow stem $l$, the diameter of which is preferably about two-thirds that of the piston $k$. Said piston slides within a bore $m$ which has at its inner end a bore $n$ of reduced diameter in which the hollow stem $l$ of the piston nicely fits. The tolerance between the working parts of both valves is made as small as practicable so as to prevent, as far as possible, fluid from escaping past the pistons, still being sufficient, however, to insure free working of the parts. At the inner end of the small bore $n$ of the master valve C, a port $o$ connects with the space to the right of the clutch-actuating device, which may be either the ring 94 in Fig. 1 or the diaphragm and plate 103 and 100 respectively, in Fig. 9.

The hollow stem $l$ of the master valve is surrounded by a spring $p$ which tends to maintain the valve in its outer radial position.

Figure 5:
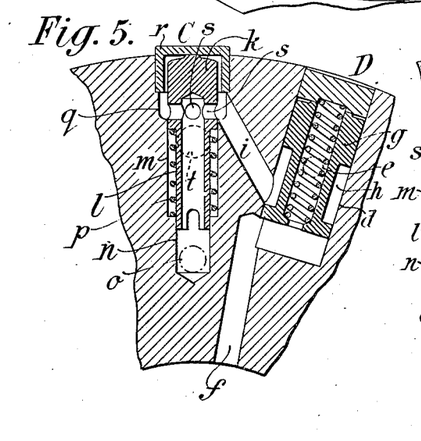
Figs. 5 and 6 are fragmentary transverse cross-sections taken along the line V—V of Fig. 1, showing the automatic valve mechanism for controlling the friction clutch in two different positions, both sections being shown as viewed from the left.
Figure 6:
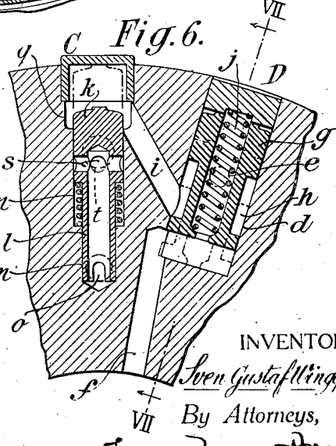

The port or passage $i$ connecting the two valve chambers, as shown in Figs. 5 and 6, is inclined so that the lower part of the pilot valve chamber communicates with the upper part of the master valve and at a point where the bore $m$ in which the valve piston slides is somewhat enlarged so as to provide a space $q$ around the valve head $k$. The outer end of the valve bore is closed by a cap $r$ which is hollowed out to receive the head of the valve and is sufficiently large to permit fluid to completely surround the valve head and also to act against its top surface.

Through the valve head $k$, ports $s$ are formed to connect the space $q$ surrounding the valve head with the interior of the hollow valve stem $l$. When the master valve C is in the position shown in Fig. 5, the ports $s$ communicate with the space $q$, which receives fluid from the pilot valve D through passage $i$. When the valve C is in the position shown in Fig. 6, ports $s$ have moved down into the bore $m$ where they communicate with a vent port $t$ connected to the idle fluid space of the transmission through a passage $u$. At the same time, communication between the passage $i$ and the interior of the valve stem is cut off, ports $s$ no longer registering with the space $q$, which receives fluid through said passage. In either position of the valve the port $o$ always communicates with the interior of the valve, and thus it will be seen that when the master valve is in its inner position (Fig. 6), the clutch-actuating device will be placed in communication through the hollow valve stem with vent passage $t$ and relieved of fluid pressure, and when the master valve is in its outer position (Fig. 5), the clutch-actuating device will be connected through the valve stem with passage $i$, through which fluid under pressure will be delivered to cause the clutch to engage, providing, of course, that the transmission is rotating at a sufficient speed to cause the pilot valve D to occupy its outer position, as shown in Figs. 5 and 7.

According to the preferred embodiment of the present invention, the pilot valve D is responsive only to variations in speed. Below any predetermined number of R. P. M. for which the valve D is designed, it will occupy its inner position (dotted lines Fig. 6), and in this position it will prevent the master valve C from moving to its inner position because no fluid pressure will be admitted to the space $q$, and consequently there will be nothing to oppose the action of centrifugal force and spring $p$, both of which tend to keep the master valve in its outer position. However, under these circumstances since fluid pressure is entirely cut off from the master valve, the friction clutch will not be engaged as would otherwise be the case when the master valve is subjected to pressure in its outer position. This situation results in a reduced speed drive or free engine, as the case may be, as will hereinafter be particularly set forth.

With the pilot valve D in its outer position (Fig. 5), the master valve C may occupy either its outer or inner position, because, with the pilot valve in the position stated, the master valve will be exposed to fluid pressure from the working chambers of the pumps through ports and passages $e$, $h$ and $i$ tending to move such valve inwardly, and also to the action of centrifugal force tending to move the valve outwardly. The position of the master valve is thus determined by the simultaneous and opposing actions of centrifugal force and fluid pressure, the spring $p$ further augmenting the action of centrifugal force in opposition to fluid pressure, which tends to move the valve inwards. When the pilot valve is in its outer position the master valve will therefore determine whether the friction clutch be set for direct drive or released for a reduced speed, in accordance with a force which is the resultant of the fluid pressure acting on the valve against the action of centrifugal force and spring $p$. Furthermore, since the fluid pressure is a function of the load placed upon the transmission, it will be apparent that as the load on the transmission increases, there will be an increasing tendency for the fluid pressure to move the master valve to a position corresponding to a reduced speed drive. If the speed of the prime mover remains constant, the increasing fluid pressure will eventually overcome the combined effect of centrifugal force and spring $p$ and set the transmission for a reduced speed. Assuming now that the transmission is so set, the master valve C being in its inner position as shown in Fig. 6, and the load remaining constant, if now the speed of the prime mover be increased, the driving rotor in which the valves are mounted will increase the action of centrifugal force upon the master valve, and there will come a point where the combined action of centrifugal force and spring $p$ will be sufficient to overcome the fluid pressure due to the then existing load and move the master valve into the position shown in Fig. 5, in which position a direct drive will be established by the hydraulic engagement of the friction clutch between the driving rotor 1 and the releasable stator 5. From the foregoing, it is clear that the master valve is moved to its outer position, or to its inner position, according as to which of the forces due to engine speed or load torque, preponderates. At high engine speed a relatively heavy load will be required to set the transmission for a reduced speed drive, and at low engine speed a relatively small load will set the transmission for a reduced speed drive. The control effected by the automatic valves, therefore, corresponds to the best practice in manual gear shifting.

To avoid fluttering and other irregularities in the operation of the master valve C, the valve is constructed so that its effective pressure area against which fluid may act to move the valve inwards, is very much greater when the valve is in its inner position than when the valve is in the outer position. When the valve is in the position shown in Fig. 5, its effective pressure area is represented by the difference in cross-sectional area between the bore $m$ and the bore $n$, since fluid pressure enters the interior of the valve and over the area of bore $n$ acts outwardly in opposition to the pressure on the head of piston $k$. When the valve is in the inner position, however, ports $s$, which admit pressure to the valve interior, are no longer open, and in consequence, fluid acts upon the valve head $k$ with full effect, there being no opposing fluid pressure whatever. The result of this design is to keep the valve in its inner position once it has been moved to such position, until the fluid pressure which brought about such movement and set the transmission for reduced speed drive shall have decreased materially below that pressure which effected the movement. If this construction is not employed, the valve would tend to move outwardly the moment the pressure fell below that required to shift the valve inwardly, and under certain conditions the transmission would then be shifted from high or direct drive into reduced speed drive and back again to direct at very frequent intervals and without permitting a sufficiently long operation in reduced speed to obtain the benefits of acceleration.

For example, with the modern six cylinder car it is possible to slow down in direct drive to five miles an hour, and even on a fairly steep grade gradually accelerate up to any speed within the capacity of the motor, but the time required to attain any given speed will be very much longer than if intermediate driving ratios were employed when the car speed is low to permit the engine to turn over at a speed where it is developing something like its maximum horse power. The design of the master valve C is calculated, within practical limits, to bring about this desirable result by keeping the transmission set in reduced speed as long as the car acceleration will be improved by reduced speed operation.

Having now described the automatic control mechanism whereby direct and intermediate speed drives are obtained, we will now describe the automatic mechanism which provides the condition of free engine and a variable slipping clutch effect between free engine and the aforesaid intermediate speed.

The mechanism for shifting from direct drive to intermediate speed or vice versa comprises an automatic hydraulically-operated friction clutch. The control now to be described comprises one or more automatically-actuated valves which control by-pass ports $v$, through which the working or pressure chambers of the pumps are by-passed to the idle fluid side of the transmission. It is obvious that if such by-pass ports are opened, no appreciable driving effect will be produced upon the driven rotor 3 and driven shaft 4 by rotating the driving rotor 1. A pumping effect will be set up between the vanes 20 on the driven rotor and the abutments 22 on the driving rotor, but no pressure will be generated because the fluid simply idly flows out from between them, through the by-pass ports and back through chamber 34' and ports 34'' in plate 32 into the idle fluid space 50 surrounding the pumps. In the embodiment of the invention illustrated in Figs. 1 and 8, two of these free-engine or idling valves are shown, but since they are of identical construction, only one will be particularly described.

The valve in its entirety is referred to by the letter E and comprises a bore $w$, having ports $v$ and $x$, and within which slides a piston $y$ having towards its outer end an annular recess $y'$. When the valve is in the inner position (Fig. 1), the annular recess provides a communication between the ports $v$ and $x$ whereby fluid flows freely from the working chambers of the pump outward through ports $x$ into the idle fluid spaces 34' surrounding the valve mechanism, and which are in open communication with the other idle fluid spaces of the transmission through passages 34'' as hereinbefore set forth. When the valve is in its outer position (Fig. 8), port $v$ is closed, locking the fluid within the working chambers of the two pumps where it may act either to produce an intermediate speed drive or direct drive in accordance with the control of the previously described valves C and D acting on the friction clutch. Between these two extreme positions the valve E may assume an infinite number of intermediate positions by which varying degrees of slip are obtained running from 100% slip when the valve is open, to no slip when the valve is closed.

The position of the valve E is automatically determined by the speed of the driving rotor. The valve may serve as its own centrifugally governing mass, as illustrated, the outward movement of the valve piston under the influence of centrifugal force being opposed by a coiled spring $z$, which is retained in place by a guide rod $z'$, the guide and spring fitting within a central bore $z''$ formed in the valve piston. The spring $z$ is designed with respect to the mass of the piston valve so that up to a speed of 250 R. P. M. the valve will be retained in its inner or wide open position. This speed is arbitrarily chosen as a suitable idling speed for the automobile engine, but obviously, if it were desired to have the engine idle at higher speeds, it would simply require a spring of slightly greater tension to be used or an adjustment provided for the present spring. Below the speed of 250 R. P. M., the valve being wide open, no appreciable torque will be transmitted from the driving to the driven parts of the transmission. If now the engine throttle be gradually opened, thereby increasing the speed of the driving rotor 1 in which the valves E are mounted, the ports $v$ will be gradually closed by the outward movement of the valve against the resistance of the spring under the increasing centrifugal force. This will result in a very smooth and gradual application of power to the load, the free by-passing of fluid from the pressure chambers of the pumps being more and more restricted with increasing speed, thereby building up higher pressures within the pumps, which, acting on the vanes of the driven rotor, smoothly accelerate the load up to the intermediate speed of the transmission, which is determined by the relative capacities of the delivery pump A and receiving pump or motor B.

It will be observed that as soon as the valves E commence to restrict the by-pass ports and thereby create pressure within the pumping system, the stator will tend to rotate backwardly, but such motion being checked by the ratchet device 8, a booster effect will be had in the motor B. This action will become more effective with increasing pressure as the valves are closed. In consequence of this, the efficiency of the transmission is materially increased over the range from zero up to intermediate speed than if the acceleration were produced solely by the slipping clutch action of a by-pass valve without the booster effect of the motor. Ordinarily the power loss in a slipping clutch is directly proportional to the difference in speeds between the driving and driven elements, but in the present construction this will only be true at the instant of starting, and actually over the entire range between zero and intermediate speed the losses will be reduced practically one-half because of the booster action in the motor.

The two valves E controlling ports $v$ (one for each of the pressure chambers of the delivery pump, which is of the duplex type, i. e., the pump has two abutments) are connected together by means which will now be described, so that their movements, while in opposite directions, will be equal and synchronous. Within the bore $z''$ of each of the valve pistons $y$, one end of an offset arm 110 is fastened by means of a pin 111. On the other end of each of the offset arms 110, are formed cylindrical lugs 112, said lugs engaging diametrically opposite slots 113 in a ring 114 surrounding the hub extensions 32' of the driving rotor and freely rotatable thereon.

Figure 8:
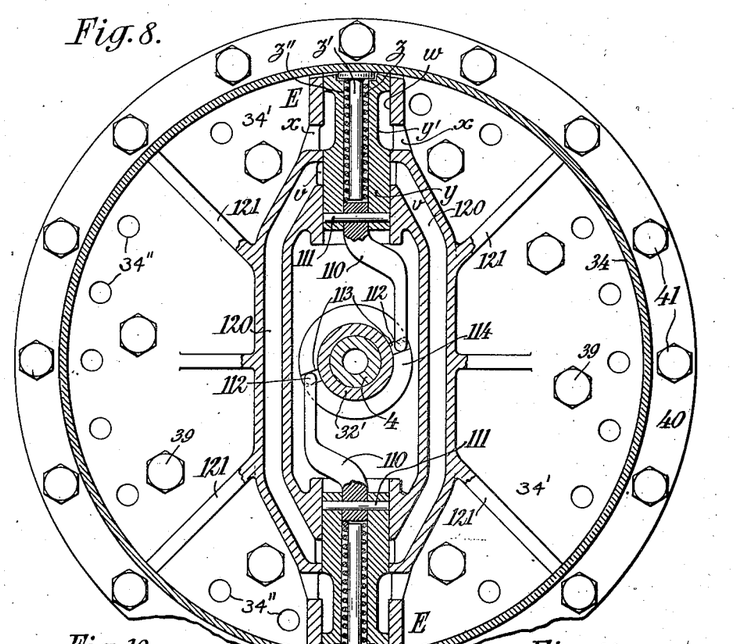
Fig. 8 is a transverse cross-section taken along the line VIII—VIII of Fig. 1, and shows the by-pass valves in section as they appear viewed from the right.

While the valves, if perfectly adjusted, would tend to move synchronously without any connection between them, the linkage described is preferably employed to insure their synchronous operations. Pins 115 set in the wall of the valve bores engage slots 116 toward the inner ends of the valve pistons whereby the valves are prevented from rotating and yet are permitted free reciprocatory movement. The diametrically-opposite pressure chambers of the pumps are preferably at all times connected together. By this means a perfect equalization of fluid pressure will be obtained, and practically all unbalanced forces between the various rotating parts of the transmission eliminated. A convenient connection between the pressure chambers is provided by conduits 120 which communicate with the annular recesses $v'$ surrounding the valve bores $w$, the pressure ports $v$ at all times communicating with said recesses regardless of the position of the valves $y$ (Figs. 1 and 8).

The pressure-balancing channels 120 are preferably formed in the main casting of the end plate 32, as are also the housings for the two valves E. The walls of the valve housings and pressure-balancing channels need not be of great thickness, as none of these parts are subjected to mechanical stress and consequently need only be sufficiently strong to withstand the interior fluid pressure. Webs 121 may be cast integrally with the end plate 32 and the valve housings to support and brace the latter, and also to reinforce the cover plate 34 which completely encloses the idling valve mechanism.

In Fig. 11 there is shown a development of the working chambers of the pumps. The reverse curves X indicated in dotted lines between the two pumps show the actual path of the fluid on its way from the delivery pump A to the receiving pump B. So smooth and direct a passage between the two pumps is rendered possible by the elimination of any valves between them, and, as hereinbefore set forth, has greatly decreased the losses which have heretofore been occasioned by the resistance to the flow of fluid through tortuous passages and valve mechanisms. The pressure chambers of the two pumps are at the same radial distance from the axis of the transmission, and consequently the actual length of the passage connecting the two pumps need not be greater than one inch, and may, by proper design and use of correct materials in the construction of the device, be reduced to even less than this. A feature which materially contributes to the high efficiency of the present transmission is the curved and angularly-disposed faces Z of the abutments 13 and 22, by means of which the fluid, instead of being abruptly diverted at right angles to its motion in the delivery pump chambers, is gradually accelerated by the smooth curves Z, so that it leaves the pump A and enters the receiving pump B smoothly and without turbulence. The form and arrangement of the abutments 13 and 22 by which this smooth flow of fluid out of the delivery pump and into the receiving pump is obtained, is fully described in my co-pending United States application Serial No. 103,036.

Certain of the features embodied in this invention are applicable to a wide variety of hydraulic transmission apparatus, and it is to be understood that the transmission hereinbefore described is merely chosen as illustrative of one application of the features of the invention to a hydraulic transmission of the differential pumping type. The invention obviously is not limited to a transmission employing only two pumps. The arrangement of driving and driven parts is not restricted to any of the forms illustrated. In the hydraulic transmission art a number of differential pumping devices are well known which are not herein particularly referred to, but which obviously are well adapted to employ the automatic transmission ratio controlling devices hereinbefore described. A well-known alternative form for the differential pumping type of transmission shown in Fig. 1 amounts to the same construction turned inside out; that is to say, the rotor which is common to the two pumps A and B is an internal rotor, while the stator and second rotor are formed externally to said common rotor. In this latter construction the power may be applied either to the common internal rotor or to the second external rotor co-operating therewith, resulting in transmissions having the characteristics of what I have termed the normal and the inverted drives respectively.

The invention may be otherwise variously modified and embodied without departing from the spirit thereof, as set forth in the following claims.

What I claim is:

1. A change-speed transmission comprising driving and driven elements, hydraulic speed-varying pumping means including a releasable stator, and a clutch between said stator and one of said elements.

2. A change-speed transmission comprising driving and driven elements, hydraulic speed-varying pumping means including a releasable stator, and a clutch between said stator and one of said elements, said clutch adapted when engaged to rotate the stator and thereby hydraulically couple the elements together for direct drive.

3. A change-speed transmission comprising driving and driven elements, hydraulic speed-varying pumping means including a releasable stator, and a friction clutch between said stator and one of said elements, and hydraulic means for actuating said clutch.

4. A change-speed transmission comprising driving and driven elements, hydraulic speed-varying pumping means including a releasable stator, a clutch between said stator and one of said elements, and means actuated by centrifugal force and fluid pressure for controlling the operation of said clutch.

5. A change-speed transmission comprising driving and driven elements, hydraulic speed-varying pumping means including a releasable stator, a clutch between said stator and one of said elements, and centrifugally-operated means for controlling the clutch.

6. A change-speed transmission comprising driving and driven elements, hydraulic speed-varying pumping means including a releasable stator, a clutch between said stator and one of said elements, and pressure-operated means responding to load torque for operating the clutch.

7. A change-speed transmission comprising driving and driven elements, hydraulic speed-varying pumping means including a releasable stator, a clutch between said stator and one of said elements, hydraulic means for actuating said clutch, and a valve for controlling the said clutch-actuating means responding oppositely to centrifugal force and fluid pressure.

8. A change-speed transmission comprising driving and driven elements, hydraulic speed-varying pumping means including a releasable stator, a clutch between said stator and one of said elements, hydraulic means for actuating said clutch and automatic means for controlling said clutch-actuating means, said automatic means comprising a master valve and a pilot valve, the latter responding to centrifugal force and controlling the admission of pressure to the master valve.

9. A change-speed transmission comprising driving and driven elements, hydraulic speed-varying pumping means including a releasable stator, a clutch between said stator and one of said elements, said clutch comprising a disk connecting with the stator and coacting with a friction part carried by one of the said elements, and a pressure-actuated part to force them together.

10. A change-speed transmission comprising driving and driven elements, hydraulic speed-varying pumping means including a releasable stator, a clutch between said stator and one of said elements, and a centrifugally-operated by-pass valve for starting and stopping.

11. A change-speed transmission comprising a driving element, a driven element, and a releasable stator, two pumps, a fluid circuit connecting said pumps, one of said pumps being actuated by the difference in speed between the said driving and driven elements, the other of said pumps being actuated by the difference in speed between one of said elements and said releasable stator, and mechanical clutching means between said stator and one of said elements.

12. A change-speed transmission comprising a driving element, a driven element, and a releasable stator, two pumps, a fluid circuit connecting said pumps, one of said pumps being actuated by the difference in speed between the said driving and driven elements, the other of said pumps being actuated by the difference in speed between one of said elements and said releasable stator, a mechanical clutch between said stator and one of said elements, and hydraulic actuating means for said clutch.

13. A change-speed transmission comprising driving and driven elements, hydraulic speed-varying pumping means including a releasable stator, a clutch between said stator and one of said elements, and torque-responsive means adapted to actuate said clutch.

14. A change-speed transmission comprising driving and driven elements, hydraulic speed-varying pumping means including a releasable stator, a clutch between said stator and one of said elements, and speed-responsive means adapted to actuate said clutch.

15. A change-speed transmission comprising driving and driven elements, hydraulic speed-varying pumping means including a releasable stator, a clutch between said stator and one of said elements, and means simultaneously and oppositely responsive to the speed of one of said elements and the torque load for actuating said clutch.

16. A change-speed transmission comprising driving and driven elements, hydraulic speed-varying pumping means including a releasable stator, a clutch between said stator and one of said elements, torque-responsive means adapted to actuate said clutch, said means requiring a materially higher load torque to initiate its movement than is required to maintain said means in the position to which it is moved by increasing torque.

17. A change-speed transmission comprising driving and driven elements, hydraulic speed-varying pumping means including a releasable stator, a hydraulically-actuated clutch between said stator and one of said elements adapted, when engaged, to rotate the stator and thereby hydraulically couple the elements together for direct drive.

18. A change-speed transmission comprising driving and driven elements, hydraulic speed-varying pumping means including a releasable stator, a hydraulically-actuated clutch between said stator and one of said elements, and a valve oppositely responsive to fluid pressure and centrifugal force for controlling said clutch.

19. A change-speed transmission comprising driving and driven elements, hydraulic speed-varying pumping means including a releasable stator, a hydraulically-actuated clutch between said stator and one of said elements, and a valve responsive to fluid pressure, said valve having a greater effective pressure area in the position to which it is moved by increasing fluid pressure than it has in the position from which it is so moved.

20. A change-speed transmission comprising driving and driven elements, hydraulic speed-varying pumping means including a releasable stator, and a hydraulically-actuated clutch between said stator and said driving element.

21. A change-speed transmission comprising driving and driven elements, hydraulic speed-varying pumping means including a releasable stator, a hydraulically-actuated clutch between said stator and said driving element, and a speed-responsive valve for controlling said clutch.

22. A change-speed transmission comprising driving and driven elements, hydraulic speed-varying pumping means including a releasable stator, a hydraulically-actuated clutch between said stator and said driving element, and a valve oppositely-responsive to fluid pressure and the speed of the said driving element for controlling said clutch.

23. A change-speed transmission comprising driving and driven elements, hydraulic speed-varying pumping means including a releasable stator, a ratchet device adapted to check the backward rotation of said stator but to permit free forward rotation thereof, and a clutch between said stator and one of said elements adapted by its mechanical control of said pumping means to hydraulically couple the elements together.

24. A change-speed transmission comprising driving and driven elements, hydraulic speed-varying pumping means including a releasable stator, a ratchet device adapted to check the backward rotation of said stator but to permit free forward rotation thereof, and a fluid-actuated clutch between said stator and the said driving element.

25. A change-speed transmission comprising a driving element, a driven element, and a releasable stator, two pumps, a fluid circuit connecting said pumps, one of said pumps being actuated by the difference in speed between the said driving and driven elements, the other of said pumps being actuated by the difference in speed between said driving element and said releasable stator, and a clutch between said stator and said driving element.

26. A change-speed transmission comprising a driving element, a driven element, and a releasable stator, two pumps, a fluid circuit connecting said pumps, one of said pumps being actuated by the difference in speed between the said driving and driven elements, the other of said pumps being actuated by the difference in speed between said driving element and said releasable stator, and a hydraulically-actuated friction clutch between said stator and said driving element.

27. A change-speed transmission comprising a driving element, a driven element, and a releasable stator, two pumps, a fluid circuit connecting said pumps, one of said pumps being actuated by the difference in speed between the said driving and driven elements, the other of said pumps being actuated by the difference in speed between said driving element and said releasable stator, a fluid pressure actuated clutch between said stator and said driving element, an automatic control valve carried by said driving element, said valve being oppositely-responsive to fluid pressure and centrifugal force and adapted to control said clutch.

28. A change-speed transmission comprising a driving rotor, a driven rotor, and a releasable stator, a delivery pump actuated by the difference in speed between said driving and driven rotors, a receiving pump actuated by the difference in speed between said driving rotor and said stator, a hydraulically-actuated clutch adapted to connect said driving rotor and said stator together, and a valve mounted in said driving rotor adapted to hydraulically control said clutch.

29. A change-speed transmission according to claim 28, further characterized in that the driving rotor comprises a casing surrounding said driven rotor and said stator.

30. A change-speed transmission according to claim 28, further characterized by the inclusion of a by-pass valve adapted to permit a variable hydraulic slip between the said driving and driven rotors whereby operating conditions may be obtained varying from free engine to the reduced speed drive determined by the relative capacities of the said pumps.

31. A change-speed transmission according to claim 28, further characterized by the inclusion of an automatic by-pass valve mounted in said driving rotor and sensitive to the speed thereof, adapted to permit a variable hydraulic slip between the said driving and driven rotors whereby operating conditions may be obtained varying from free engine to the reduced speed drive determined by the relative capacities of the said pumps.

In witness whereof, I have hereunto signed my name.

SVEN GUSTAF WINGQUIST.